United States Patent Office 2,962,347
Patented Nov. 29, 1960

2,962,347

METHOD OF RECOVERING ZIRCONIUM VALUES FROM ZIRCON

Charles J. Sindlinger and Carl C. Clayton, Jr., Corpus Christi, Tex., assignors to Columbia-Southern Chemical Corporation, Allegheny County, Pa., a corporation of Delaware No Drawing. Filed June 18, 1957, Ser. No. 666,478

10 Claims. (Cl. 23—16)

This invention relates to an improvement in the method of recovering zirconium from zircon sand. Zircon sand is one of the more common ores from which zirconium may be recovered. It is predominantly a compound of zirconium and silicon, which compound has the approximate composition $ZrO_2SiO_2$. The silica is chemically bound with the zirconium.

In the recovery of zirconium from such an ore, it is necessary to treat the ore in order to break the chemical bond between the silica and the $ZrO_2$. It has been recognized that this may be effected by heating together a mixture of zircon sand and an alkali metal hydroxide, such as sodium hydroxide. The result is to convert the silica component to a water soluble form, probably as sodium silicate, so that upon water extraction, the silica can largely be removed leaving a product which is largely $ZrO_2$ as an undissolved residue. This $ZrO_2$ may then be extracted with various acids, such as hydrochloric acid, sulphuric acid, acetic acid or other water soluble inorganic acid, in order to solubilize the $ZrO_2$ component.

In the practice of this process, there are several difficulties encountered. In the first place, the mixture of zircon and caustic is quite corrosive and consequently serious corrosion of equipment takes place. This may even be so severe as to result in an undue contamination of the product with the materials of construction. Furthermore, in the course of the operation, serious caking of the mixture can take place. This frequently makes difficult the performance of the operation in a continuous manner.

According to the present invention, an improved process for reacting an alkali metal hydroxide, such as sodium hydroxide, with zircon ore has been provided. In the practice of a typical embodiment of the invention herein contemplated, zircon ore in pulverulent state is heated and an alkali metal hydroxide is added to the heated zircon, preferably in molten state and at substantially the temperature at which reaction occurs. The alkali metal hydroxide normally is essentially anhydrous, containing less than 20 percent by weight of water. However, more dilute alkali metal hydroxide is used so long as the reaction mixture remains solid and is not unduly cooled. As a consequence, the alkali metal hydroxide reacts with the zircon, producing a readily friable product. Hereinafter, the product which is produced by the reaction of an alkali metal hydroxide with zircon ore will, for convenience, be referred to as "frit" or "sodium or alkali metal zirconate."

The temperature to which the zircon ore is heated depends upon the desired performance of the process. In the preferred embodiment, the zircon is heated to a temperature at which zircon reacts with alkali metal hydroxide, for example, 450 to 500° C. or above. In such a case, the alkali metal hydroxide reacts with the zircon as the alkali metal hydroxide is added or shortly thereafter.

The practice of this process offers a number of advantages. Danger of corrosion during the preheat period is substantially minimized since the product contains no alkali metal hydroxide during such period. Moreover, since the sodium hydroxide is added after the sand has reached at least 450-500° C., tendency of the sodium hydroxide to segregate from the ore is appreciably minimized. Thus, it has been found that when equal parts by weight of aqueous sodium hydroxide and zircon ore are heated gradually from room temperature up to a temperature of 500° C. or above, the mixture passes through a liquid phase and the sodium hydroxide tends to melt at a temperature of about 320° C. and to collect in the lower portion of the reactor. This is objectionable for several reasons. In the first place, sodium hydroxide in molten state is quite corrosive and therefore the crucible or other equipment used can be severely attacked by the molten caustic during the period of heating up to reaction temperature. Secondly, segregation of the sodium hydroxide can tend to cause incomplete reaction. Moreover, the formation of a liquid phase during the course of the heating tends to cause the reaction mixture to cake and/or agglomerate severely, thus making handling more difficult.

In contrast, in the present process, sodium hydroxide is consumed rapidly, often substantially as rapidly as it is added, by supplying it to the reaction mixture substantially at the temperature at which the reaction takes place. Consequently, the sodium hydroxide or like alkali metal hydroxide is present in the reaction mixture for but a very short period of time. This means that there is only a very short period of time that the mixture is seriously corrosive.

The rate of addition of the alkali metal hydroxide to the heated sand is controlled so that the mixture remains solid and does not pass into the form of an essentially liquid slurry or mixture. This is due to the fact that any molten sodium hydroxide which tends to be present is either reacted essentially as rapidly as added or is so diluted with unreacted zircon sand or previously formed frit that contact of the molten caustic with the walls of the vessel is substantially minimized. Of course, this does not mean that no molten caustic is formed. However, it does mean that the reaction mixture does not convert to a fluid state but remains as either a friable pulverulent mass or as a readily workable plastic mass.

The process may be conducted in a continuous manner by feeding the sand into the preheat section of a rotary kiln where it is preheated to above about 450-500° C., preferably 600 to 650° C. Thereafter, the mixture is caused to pass through the remainder of the kiln while heating the mixture, and the alkali metal hydroxide is added to the sand at one or several places located longitudinally of the kiln. As a consequence, sodium zirconate frit is formed at the point where the initial introduction of alkali metal hydroxide is produced and, as the mixture tumbles, it is delivered to a point further down the kiln and gradually increases in frit concentration by reaction of the alkali metal hydroxide with the zircon. As it reaches the second point of introduction of alkali metal hydroxide, the reaction mixture thus comprises a mixture of frit and ore, and the frit serves to prevent the mixture from becoming liquid. In the practice of a process of this character, the alkali metal hydroxide may be introduced into the kiln at several points (2, 3, or more) spaced longitudinally in the kiln and in the direction of flow toward the exit end of the kiln.

The process may be performed in other convenient ways. For example, preheated zircon may be mixed with alkali metal hydroxide in a mixer provided with a suitable agitating means, such as a pug mill, pan mixer or hearth equipped with rabble means, and the mixture allowed to react either in the mixer or in a separate receptacle into which it is discharged.

The amount of alkali metal hydroxide that is used should be enough to react with a substantial amount of the zirconium ore but should not be so large as to cause production of a liquid reaction mixture. That is, the mixture should remain in either an essentially pulverulent state or at least as a plastic or semi-plastic mass in which the reaction mixture as a whole does not have the properties of a liquid. Where a substantial amount of frit is present or where the alkali metal hydroxide is added in increments or where the temperature is high enough to ensure very rapid reaction, e.g., 600–700° C., the amount of alkali metal hydroxide may be in substantially stoichiometric amounts. That is, in the case of sodium hydroxide, it may range from about 0.8 to 2 (rarely over 1.5) pounds per pound of zirconium ore. Where no frit is present or where all of the alkali is added at one time, it frequently is found that addition of this amount of alkali metal hydroxide may tend to cause the mass to get unduly sticky and plastic. In such a case, it frequently is desirable to use substantially less sodium hydroxide than the stoichiometric amount, for example, 0.1 to 0.8 pound per pound of zircon ore. In such a case, the unreacted zircon may be recycled after the extraction of soluble components. Equivalent amounts of potassium hydroxide or other alkali metal hydroxide may be used in lieu of sodium hydroxide.

In the practice of one embodiment of the process, the alkali metal hydroxide may be added to the upper portion of a relatively quiescent layer or mass of preheated zircon and the amount of such alkali metal hydroxide limited so that the alkali metal hydroxide does not penetrate or percolate to the bottom of the reaction mixture. In such a case, a layer of relatively unreacted sand remains on the bottom of the reactor and serves to essentially isolate or separate the alkali metal hydroxide and the resulting frit from the materials of construction, thereby eliminating corrosion thereof. Alternatively, an intermediate layer of frit may be laid upon the bottom of the reactor and ore deposited on top of such frit. Thereafter, the ore may be heated and alkali metal hydroxide added thereto, care being taken to avoid contact of the alkali metal hydroxide with the floor of the reactor.

The zircon ore which is subjected to treatment normally is relatively finely divided, usually having a particle size below about 50 mesh. If the alkali metal hydroxide is added in a solid state, it may be in the form of flakes, pellets or powder. It is usually most advantageous to add substantially anhydrous alkali metal hydroxide either in pulverulent or molten state. However, aqueous alkali metal hydroxide may be used.

The following examples are illustrative:

*Example I*

Two hundred fifty grams of zircon sand containing 66.9 percent by weight of $ZrO_2$ and 32.3 percent by weight of $SiO_2$ and having a particle size below 50 mesh was placed in a crucible to form a bed about 0.75 inch deep. This sand was heated in the range of 600 to 650° C. Thereafter, 25 grams of molten anhydrous sodium hydroxide heated to about 500° C. was poured into the layer of preheated zircon. The sodium hydroxide was largely consumed in the top part of the layer and there was no substantial penetration of sodium hydroxide to the bottom of the crucible. The product, after reaction, was cooled and separated by gentle hand sieving into a sand rich portion which passed a 50-mesh screen and a reacted portion which remained on the screen. The reacted frit was extracted with water and then was extracted with strong hydrochloric acid. About 15 percent of the zirconium in the ore was dissolved in the acid. This corresponds to the amount of sodium hydroxide used. Thus, the amount of sodium hydroxide added was only about 15 percent of that stoichiometrically required to obtain essentially complete acid solubilizing of the zirconium according to the following equation:

$$ZrO_2.SiO_2 + 4NaOH \rightarrow Na_2O.SiO_2 + Na_2O.ZrO_2 + 2H_2O$$

*Example II*

The process of Example I was repeated using 50 grams of molten caustic soda heated to about 500° C. in lieu of 25 grams. About 25 percent of the zirconium was solubilized.

*Example III*

Two hundred fifty grams of zircon sand was heated to 550 to 700° C. as in Example I, and about 25 grams of flake caustic soda was added to the top of the bed. About 15 percent of the zirconium was converted to an acid soluble state.

*Example IV*

Two hundred fifty grams of zircon sand of the type set forth in Example I was placed in a nickel crucible 6 inches high and 3 inches in diameter, forming a bed 0.75 inch deep. The crucible was heated in an electric furnace and the bed was agitated by an impeller. The sand was heated to about 600 to 650° C. Thereafter, 125 grams of molten sodium hydroxide heated to about 500° C. was added to the mixture in small increments, care being taken to avoid addition of an amount which converted the reaction mixture to a moist state. Throughout the entire period of reaction, the reaction mixture remained pulverulent and dry in appearance. Reaction occurred immediately after each addition. After addition of sodium hydroxide was completed, the mixture was cooled, leached with water and then with acid. It was found that about 40 percent by weight of the zirconium in the ore had been rendered acid soluble.

The process of Example IV was repeated using, respectively, 200 and 250 grams of sodium hydroxide in two subsequent experiments. Seventy-one percent and 84 percent, respectively, of the zirconium was rendered acid soluble. In the course of addition of 250 grams of sodium hydroxide, the mixture became slightly moist but remained in essentially solid state as distinguished from a liquid mass.

The above experiments were directed to the preferred embodiments of the invention in which the zircon is preheated to a temperature at which it reacts with the alkali metal hydroxide prior to addition of the alkali metal hydroxide. By this process, alkali metal hydroxide is present in the mixture a minimum length of time, thus minimizing corrosion.

It will be understood, however, that the alkali metal hydroxide may be added to the zircon somewhat below this reaction temperature. Thus, the zircon may be preheated about 400° C. or even somewhat lower, and the alkali metal hydroxide added in solid or liquid state. Moreover, the reaction mixture may cool somewhat during addition of alkali metal hydroxide. Such covering rarely reduces the temperature below 300° C. In either case, the resulting mixture is further heated to reaction temperature (above about 500° C.).

While the invention has been described with particular reference to use of sodium hydroxide in the practice thereof, other alkali metal hydroxides, including the hydroxides of potassium or lithium, may be used in equivalent amounts in the practice of the above-described examples and embodiments in lieu of all or a part of the sodium hydroxide used therein.

Although the present invention has been described with reference to the specific details of certain embodiments, it is not intended that such details shall be regarded as limitations upon the scope of the invention except insofar as included in the accompanying claims.

What is claimed:

1. The method of reacting alkali metal hydroxide with zircon which comprises heating zircon in pulverulent form to a temperature of at least 450 to 500° C. and thereafter adding an alkali metal hydroxide thereto whereby to cause the alkali metal hydroxide to react with the zircon and thereby forming a product containing silica in water soluble form while maintaining the temperature below that at which the resulting reaction mixture becomes fluid, the rate of addition and amount of alkali metal hydroxide added being low enough to prevent the reaction mixture from becoming fluid.

2. In the method of preparing an alkali metal zirconate by reacting an alkali metal hydroxide with zircon, the improvement which comprises heating zircon in pulverulent form to a temperature of at least 450 to 500° C. and thereafter adding an alkali metal hydroxide to the heated zircon whereby to cause the alkali metal hydroxide to react with the zircon and thereby forming a product containing silica in water soluble form, while maintaining the rate of addition of alkali metal hydroxide to the zircon low enough to prevent production of a liquid reaction mixture and maintaining the temperature below that at which the reaction mixture becomes fluid, the amount of alkali metal hydroxide added being in the range of 0.1 to 2 pounds of sodium hydroxide per pound of zircon, and the rate of addition of said hydroxide being low enough to prevent the reaction from becoming fluid.

3. The method of reacting sodium hydroxide with zircon which comprises heating zircon in pulverulent form to a temperature of at least 450 to 500° C. and thereafter adding sodium hydroxide to the heated zircon whereby to cause the sodium hydroxide to react with the zircon while maintaining the temperature below that at which the reaction mixture becomes fluid, the rate of addition and amount of alkali metal hydroxide being low enough to prevent the reaction mixture from becoming fluid, thereby forming a product containing silica in water soluble form.

4. The method of converting silica in zircon to a water soluble state which comprises heating zircon in pulverulent form to a temperature of at least 450 to 500° C. and thereafter adding sodium hydroxide to the heated zircon whereby to cause the sodium hydroxide to react with the zircon and thereby forming a product containing silica in water soluble form, while maintaining the rate of addition of sodium hydroxide to the zircon low enough to prevent production of a liquid reaction mixture and maintaining the temperature below that at which the reaction mixture becomes fluid, the rate of addition and amount of alkali metal hydroxide added being low enough to prevent the reaction mixture from becoming fluid.

5. In the method of treating zircon to render silica therein water soluble, the improvement which comprises heating zircon in pulverulent form to a temperature of at least 300° C., thereafter adding alkali metal hydroxide to the heated zircon, and heating the mixture to a temperature of at least about 450 to 500° C. whereby to cause reaction of the alkali metal hydroxide with the zircon, maintaining the temperature below that at which the reaction mixture becomes fluid, the rate of addition and amount of alkali metal hydroxide being low enough to prevent the reaction mixture from becoming fluid.

6. The process of claim 5 wherein the alkali metal hydroxide is sodium hydroxide.

7. In the method of reacting zircon with alkali metal hydroxide, the improvement which comprises heating zircon in a reactor to a temperature of at least 450 to 500° C. and adding an alkali metal hydroxide to the hot zircon and discontinuing addition of said hydroxide before the hydroxide penetrates to the walls of the reactor, while maintaining the temperature high enough to cause reaction of the alkali metal hydroxide with the zircon, but below that at which the reaction mixture becomes fluid.

8. A method of treating zircon ore to convert silica therein to water soluble form which comprises heating in a reactor zircon in pulverulent form to a temperature of at least 400° C., thereafter adding alkali metal hydroxide to the heated zircon, and discontinuing the addition of the alkali metal hydroxide before the resulting mixture becomes liquid, while maintaining the temperature high enough to cause reaction of the alkali metal hydroxide with the zircon, but below that at which the reaction mixture becomes fluid.

9. In the method of treating zircon ore to convert silica therein to water soluble form by heating alkali metal hydroxide with zircon in pulverulent form at a temperature above 400° C. whereby to cause reaction of the zircon with the alkali metal hydroxide, the improvement which comprises heating the zircon substantially at reaction temperature and thereafter adding the alkali metal hydroxide to the heated zircon, while maintaining the temperature of the resulting reaction mixture high enough to cause reaction of the alkali metal hydroxide with the zircon, but below that at which the reaction mixture becomes fluid.

10. The process of claim 5 wherein the zircon is heated to a temperature of 300 to 700° C.

References Cited in the file of this patent
UNITED STATES PATENTS

| 1,527,470 | Cooper | Feb. 24, 1925 |
| 1,658,807 | Kinzie | Feb. 14, 1928 |
| 2,063,811 | Jaeger | Dec. 8, 1936 |
| 2,696,425 | Kistler | Dec. 7, 1954 |

FOREIGN PATENTS

| 271,873 | Great Britain | Sept. 24, 1928 |
| 717,930 | Great Britain | Nov. 3, 1954 |

OTHER REFERENCES

Beyer et al.: U.S. Atomic Energy Comm. publication ISC 437 (Rev.).

Browning: "Introduction to the Rarer Elements," publ. by J. Wiley and Sons, New York, 1914, pages 76 and 77.

Mellor: "Comprehensive Treatise on Inorganic and Theoretical Chemistry," publ. by Longmans, Green and Co., N.Y., vol. 7, 1927, pages 101 to 103 incl., 134 and 135.